3,390,075
PROCESS FOR RECOVERING HYDROCARBON GASES FROM STREAMS THEREOF CONTAINING H$_2$S
Kenneth A. Harper, Bartlesville, Okla., assignor to Phillips Petroleum Company, a corporation of Delaware
Filed May 2, 1966, Ser. No. 546,922
9 Claims. (Cl. 208—341)

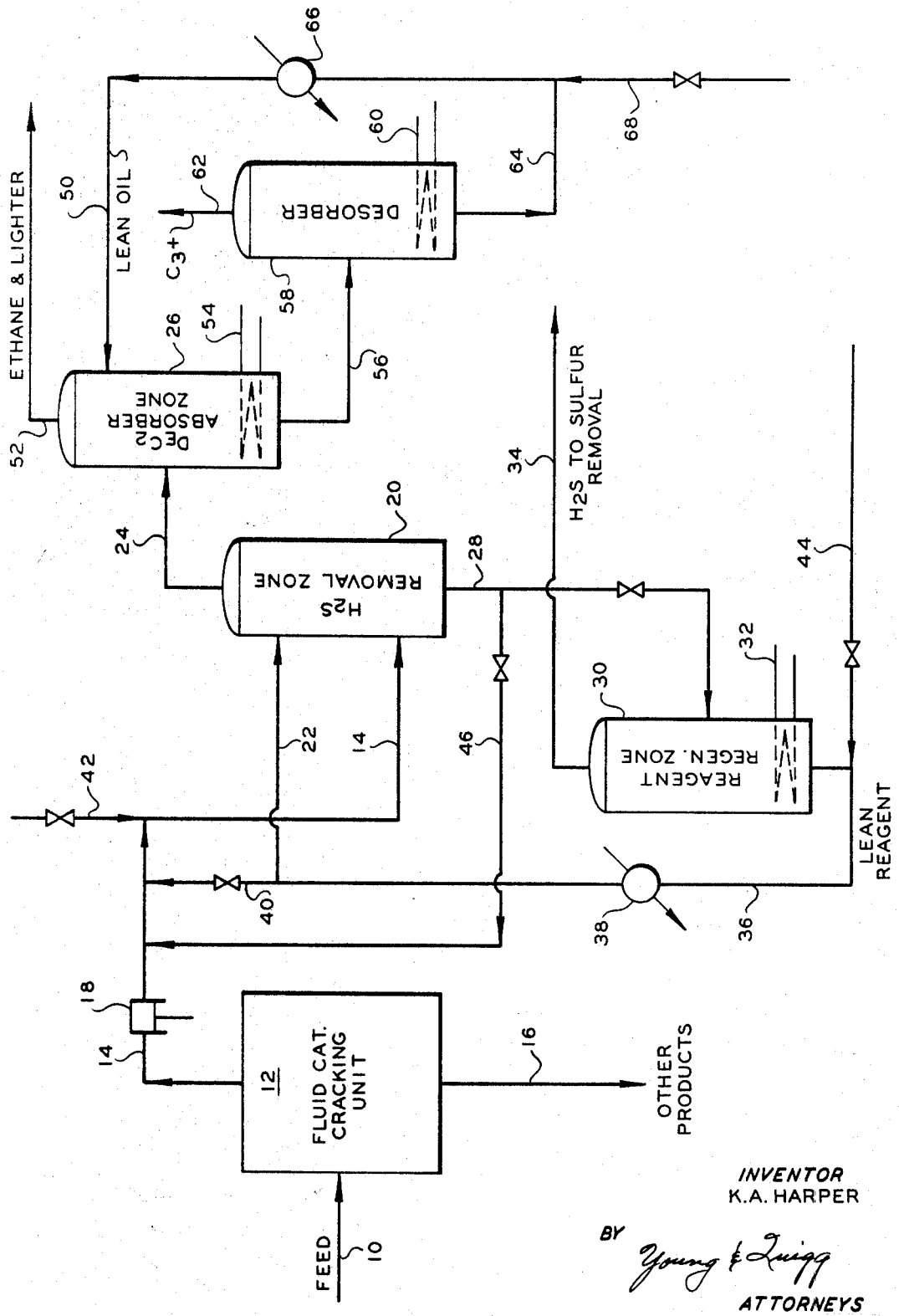

ABSTRACT OF THE DISCLOSURE

In separating a low pressure and low temperature mixed stream of light hydrocarbons containing H$_2$S into separate streams of hydrocarbons and H$_2$S, using a cool liquid absorbent for removing H$_2$S, the mixed stream is compressed for more effective absorption of H$_2$S and cooled by mixing cool absorbent from the H$_2$S absorption zone therewith before passing the mixed stream to the absorption zone. In one embodiment of the invention, the liquid absorbent mixed with the compressed gas to cool it is cooled lean absorbent from an H$_2$S desorption zone downstream of the H$_2$S absorption zone. In another embodiment, H$_2$S-rich liquid absorbent from the H$_2$S absorption zone is used as the coolant.

---

The invention relates to a process for the recovery of normally gaseous hydrocarbons from mixed streams thereof containing H$_2$S.

In the refining of various petroleum stocks to produce different grades of fuel including gasoline, heating distillates, diesel fuel, etc., a stream of normally gaseous hydrocarbons containing a substantial concentration of H$_2$S and some hydrogen is usually produced. Such a stream of normally gaseous hydrocarbons is conventionally separated into its various components to recover individual streams thereof for specific uses well known in the industry. The H$_2$S recovered is suitable for passing to a sulfur-producing plant to recover sulfur as a product of the operation.

In one plant operation in which a gaseous stream of normally gaseous hydrocarbons, hydrogen, and H$_2$S is produced in a fluid catalytic cracking operation and the cracked effluent is fractionated, the resulting gaseous overhead stream is compressed and passed thru an absorber where it is contacted in countercurrent flow with a lean absorption oil to selectively absorb C$_3$ and heavier hydrocarbons and pass ethane and lighter gases overhead. The H$_2$S in these streams is then recovered in conventional manner by contacting them with a liquid absorbent or reagent which selectively removes the H$_2$S. In this operation, the deethanizing absorber column became so corroded and damaged by hydrogen blistering and hydrogen embrittlement from contact with H$_2$S and hydrogen within one year of operation that this column had to be replaced.

This invention is concerned with more efficient and economical separation of mixed normally gaseous hydrocarbon streams containing H$_2$S into their respective components.

Accordingly, it is an object of the invention to provide an improved process for the separation of mixed normally gaseous hydrocarbon streams containing H$_2$S into separate hydrocarbon streams (free from H$_2$S) and an H$_2$S stream. Another object is to provide an improved process for separating a mixed stream of C$_1$, C$_2$, and C$_3$ and heavier hydrocarbon gases in admixture with H$_2$S into separate selected streams of H$_2$S-free hydrocarbons and a stream of H$_2$S. A further object is to provide such a separation process which makes more efficient use of the streams of absorbent utilized in extracting H$_2$S from the gaseous hydrocarbons. Other objects of the invention will become apparent to one skilled in the art upon consideration of the accompanying disclosure.

In accordance with the invention, the H$_2$S-containing mixed normally gaseous hydrocarbon stream is passed thru an H$_2$S absorption zone prior to the hydrocarbon absorption step for separating lighter hydrocarbons from heavier hydrocarbons in the mixed stream. The H$_2$S absorption zone is a relatively small piece of equipment compared to the hydrocarbon absorption column, the former costing in the thousands of dollars while the latter costs in the hundreds of thousands of dollars. This permits manufacturing the H$_2$S absorption column and the absorbent regeneration column of steels which resist corrosion without too great an expenditure therefor, thus providing long life for this piece of equipment. Even when the H$_2$S absorber and regeneration column are fabricated of ordinary carbon steel, replacement is relatively infrequent. Apparently the treating reagent and/or the high H$_2$S concentration, with substantially no hydrogen present, minimizes corrosion, hydrogen blistering, and embrittlement of these vessels.

Another aspect of the invention, as applied to a hot feed stream of mixed hydrocarbons and H$_2$S at superatmospheric pressure, comprises cooling the hot feed stream to the H$_2$S absorber by passing a portion of the H$_2$S-rich absorbent liquid effluent from the absorption zone into the hot feed stream prior to passage thereof into the absorption zone to cool the feed stream to a temperature level suitable for introduction to this zone.

In accordance with another embodiment of the invention, the H$_2$S-rich absorbent from the absorption zone is passed to a regeneration or desorption zone by heating for recovery of H$_2$S from the absorbent as an overhead stream and lean absorbent as a bottom stream, cooling the lean absorbent by indirect heat exchange, and passing a portion of the lean absorbent into the hot mixed feed stream to the absorber prior to introduction to the absorber, the other portion of lean absorbent being passed into the upper section of the absorber in conventional manner.

A more complete understanding of the invention may be had by reference to the accompanying schematic drawing which is a process flow or arrangement of apparatus illustrating the invention.

Referring to the drawing, a heavy hydrocarbon feed, such as a topped crude and/or a gas oil suitable for cracking to lighter hydrocarbons, such as C$_1$–C$_4$ hydrocarbons, gasolines, and cycle oils, is passed thru line 10 into a catalytic cracking unit 12 for conventional cracking to desirable products and fractionation into selected hydrocarbon streams. The light normally gaseous stream of hydrocarbons is recovered overhead thru line 14 and other heavier products are recovered thru line 16 and treated in conventional manner to provide selected commercial products or intermediates.

The invention is concerned particularly with the recovery of hydrocarbons and H$_2$S from the stream passing thru line 14. This stream is compressed by compressor 18 to a selected pressure suitable for the H$_2$S absorption step performed in vessel 20 to which line 14 leads. A suitable absorbent, such as sulfolane and/or an alkanolamine (including monoethanolamine, diethanolamine, triethanolamine, and other alkanolamines), is passed thru line 22 into the upper section of vessel 20 and into counterflow contact with the gas introduced thru line 14 so as to selectively absorb H$_2$S from the feed stream. The preferred reagent or absorbent is diethanolamine, and the invention will be described with reference to this reagent or absorbent hereinafter, but it is to be understood that the invention is not restricted to the use of this particular reagent or absorbent. The H$_2$S-absorption step is conventional in the art and the specific conditions in this absorption zone are not a part of the invention.

The unabsorbed hydrocarbon gases and any hydrogen present in the feed stream pass overhead thru line 24 into absorption column 26. The $H_2S$-rich absorbent comprising an aqueous solution of diethanolamine passes thru line 28 into regeneration or desorption column 30 which is provided with a conventional heating means 32 in the bottom thereof. By heating the rich absorbent, $H_2S$ is driven off and recovered overhead thru line 34 and lean absorbent is taken off the bottom of column 30 thru line 36 and passed thru indirect heat exchanger or cooler 38 to line 22 as absorbent feed to absorber 20. In accordance with one embodiment of the invention, a portion of the lean absorbent in line 36 is passed thru line 40 into line 14 downstream of compresser 18 and upstream of absorber 20. Fresh lean absorbent (aqueous ethanolamine) is injected, as needed, either thru line 42 into line 14 or thru line 44 into line 36.

A preferred embodiment of the invention comprises withdrawing a substantial portion of the $H_2S$-rich diethanolamine solution from line 28 thru line 46 and passing this selected portion into line 14 in lieu of the lean diethanolamine solution from line 40. It is more efficient and economical to utilize a portion of the $H_2S$-rich absorbent from line 28 as coolant in line 14 than to desorb the rich absorbent in vessel 30, cool the resulting lean absorbent in line 36, then utilize this processed stream as coolant in line 22. Also, by by-passing a portion of the rich reagent around column 30 thru conduit 46, column 30 can be a smaller unit as compared with charging all of the rich reagent thereto. Of course, cooler 38 is the source of cooling of this rich reagent which passes thru conduit 46, and this heat exchange occurs in absorber vessel 20.

The $H_2S$-free mixture of gaseous hydrocarbons passing into absorption column 26 is contacted in counter-current flow in conventional manner with lean absorption oil, such as debutanized gasoline, introduced thru line 50. The lean absorption oil selectively absorbs the heavier components of the feed introduced thru line 24 and the lighter components are unabsorbed and are recovered as an overhead stream thru line 52. A conventional reboiler or heater 54 supplies the heat for the absorption process in column 26. The rich oil from column 26 is passed thru line 56 to a desorption or regeneration vessel 58 which is provided with a heating means 60 for driving off the absorbed heavier hydrocarbon gases which are recovered thru line 62. The regenerated lean oil is recovered from the bottom of vessel 58 thru line 64 which connects with line 50 to provide recycle of lean oil. A cooler 66 in line 50 is utilized to reduce the temperature of the lean oil to the required level for use in column 26 in the absorption step. Fresh absorption oil is introduced as needed thru line 68 to line 64 or any other suitable location in the recycle line.

It is to be understood that conventional equipment such as valves, pumps, etc., not shown in the drawing, are utilized in the process and arrangement of apparatus of the invention.

When the feed in line 14 comprises hydrogen, methane, $C_2$'s, $C_3$'s, and a minor amount of heavier hydrocarbons along with contaminating $H_2S$, the stream is compressed to a pressure in the range of about 200–300 p.s.i.g. with a resulting temperature in the range of about 250–300° F. Sufficient coolant is introduced thru line 46 into the gas stream in line 14 to reduce the temperature of this stream to the range of 100–150° F., preferably, to about 120° F., depending upon the absorbent, the feed composition, and the operating conditions in vessel 20.

The overhead gases passing thru line 24 into absorber 26 are contacted with the lean oil therein under conditions which pass the ethane and lighter gases overhead and absorb principally the $C_3$ and heavier hydrocarbons, these being recovered from desorber 58 thru line 62.

When operating at 120° F. in vessel 20, the stream in line perature of about 180° F. and a top section temperature of about 100° F. are maintained. Absorber 26 is operated in conventional manner in accordance with the nature of the feed thereto.

The $H_2S$-rich absorbent is heated in vessel 30 to a suitable desorption temperature, preferably about 265° F., when utilizing aqueous diethanolamine as the absorbent but this temperature may range from 180–350° F., depending upon the specific absorbent being utilized. The regeneration of the absorbent in vessel 30 is also a conventional procedure and the conditions of operation do not constitute the invention. Lean absorbent in line 36 is cooled in cooler 38 to a temperature sufficiently below the desired operating temperature in absorption vessel 20 to adequately maintain this operating temperature. When operating at 120° F. in vessel 20, the stream in line 36 is cooled to a temperature substantially below 120° F. and the exact temperature will depend upon the relative volumes of absorbent and mixed feed passed to this vessel and, also, the temperature of the compressed gas downstream of compresser 18.

Preferred operating conditions in the process of the invention with the arrangement of apparatus of the drawing are set forth in the table below.

TABLE $H_2S$ removal zone (20):
    Pressure, p.s.i.g. _____ 200
    Temperature, ° F. _____ 120
Deethanizing absorber (26):
    Pressure, p.s.i.g. _____ 190
    Top temperature, ° F. _____ 100
    Bottom temperature, ° F. _____ 180
Reagent regenerator (30):
    Pressure, p.s.i.g. (0 to 10) _____ 5
    Temperature, ° F. (180–350) _____ 265

| Component | Stream No. | | | |
|---|---|---|---|---|
| | Gas Feed 14 | Rich Reagent 46 | Lean Reagent 36 | Product 24 |
| $C_1$ and lighter, mols/hr | 1,050 | 5 | 2 | 1,047 |
| $C_2$'s, mols/hr | 241 | 2 | 1 | 240 |
| $C_3$'s and heavier, mols/hr | 2,900 | 20 | 3 | 2,883 |
| Diethanolamine, bbl./hr | | ¹ 280 | ¹ 280 | |
| $H_2S$, mols/hr | 108 | 110 | 2 | Trace |
| Water | Trace | | | Trace |

¹ The example shows the flow ratio of 1:1 (280:280) between conduits 36 and 46. The ratio range can be about 1:10 to 10:1, depending upon the temperature of the compressed gas, the temperature of the rich reagent, the efficiency of contact between the rich reagent and the compressed gas, and the desired temperature of admixture, etc.

The above data illustrate operation with passage of rich absorbent thru line 46 into the compressed mixed gas stream in line 14 downstream of compresser 18. It should also be noted that the process can be operated, somewhat less advantageously, with coolant introduced from line 40 into line 14.

Certain modifications of the invention will become apparent to those skilled in the art and the illustrative details disclosed are not to be construed as imposing unnecessary limitations on the invention.

I claim:

1. A process for recovering components of a relatively low pressure and relatively low temperature mixed stream of normally gaseous hydrocarbons containing a substantial but minor concentration of $H_2S$ which comprises the steps of:

(1) compressing said mixed stream in gaseous form to a substantially higher pressure more suitable for the absorption of step (2), with attendant heating thereof;

(2) substantially cooling the mixed gaseous stream resulting from step (1) by mixing therewith upstream of the $H_2S$ absorption zone of step (3) cool absorbent from downstream of step (3);

(3) passing the cooled gaseous stream resulting from step (2) at an elevated pressure and temperature directly to a first absorption zone and countercurrently contacting said gaseous stream therein with a cool liquid absorbent for $H_2S$ to remove substantially all of the $H_2S$ from said stream and produce an $H_2S$-rich absorbent stream;

(4) passing the $H_2S$-free effluent gaseous stream directly from step (3) to a second absorption zone and countercurrently contacting said gaseous stream therein with a lean absorption oil in liquid phase to absorb the heavier hydrocarbons from said stream and pass the lighter hydrocarbon gas overhead;

(5) passing rich oil from step (4) to a first desorption zone and heating same therein to drive off an overhead stream of heavier hydrocarbon gas as a product stream and recover lean oil;

(6) recycling lean oil from step (5) to step (4);

(7) passing $H_2S$-rich absorbent from step (3) to a second desorption zone and heating same therein to drive off $H_2S$ therefrom and recover a liquid stream of lean absorbent; and (8) cooling and passing a liquid stream of lean absorbent from step (7) to step (3) as said absorbent.

2. The process of claim 1 wherein said cool absorbent of step (2) is cooled lean absorbent from the stream of absorbent of step (8).

3. The process of claim 1 wherein said cool absorbent of step (2) is $H_2S$-rich absorbent from step (3) taken upstream of said second desorption zone of step (7).

4. The process of claim 3 wherein said absorbent of step (3) is an aqueous solution of diethanolamine.

5. The process of claim 1 wherein the absorbent in step (3) is an aqueous solution of diethanolamine.

6. The process of claim 2 wherein the absorbent in step (3) is an aqueous solution of diethanolamine.

7. The process of claim 1 wherein said mixed stream comprises essentially $C_1$, $C_2$, and $C_3$ and heavier hydrocarbons, and $H_2S$, the $C_1$ and $C_2$ hydrocarbons are taken overhead from the second absorption zone of step (4), the $C_3$ and heavier hydrocarbons in said stream are absorbed in said lean oil, said pressure and temperature resulting from step (1) are in the range of 200 to 300 p.s.i.g. and 250 to 300° F., and said cooling in step (2) reduces said temperature to the range of 100 to 150° F.

8. The process of claim 7 wherein said liquid absorbent for $H_2S$ is an aqueous solution of diethanolamine.

9. The process of claim 7 wherein said liquid absorbent is diethanolamine and cooled lean diethanolamine from step (7) is used as the absorbent in step (2).

References Cited
UNITED STATES PATENTS

| | | | |
|---|---|---|---|
| 2,238,201 | 4/1941 | Wilson et al. | 23—3.3 |
| 2,544,564 | 3/1951 | Peterson et al. | 23—2 |
| 3,126,331 | 3/1964 | Landis et al. | 208—240 |
| 3,154,482 | 10/1964 | Cahn et al. | 208—341 |
| 3,161,461 | 12/1964 | Deal et al. | 208—341 |
| 3,205,164 | 9/1965 | Brown | 208—240 |

HERBERT LEVINE, *Primary Examiner.*